United States Patent [19]

Chen et al.

[11] Patent Number: 4,764,267
[45] Date of Patent: Aug. 16, 1988

[54] MULTI-STAGE CATALYTIC REFORMING WITH HIGH RHENIUM CONTENT CATALYST

[75] Inventors: Hong C. Chen; Cliff M. Detz, both of San Rafael; Paul W. Tamm, Oakland, all of Calif.

[73] Assignee: Chevron Research Company, San Francisco, Calif.

[21] Appl. No.: 115,792

[22] Filed: Oct. 29, 1987

[51] Int. Cl.$^4$ .............................................. C10G 35/06
[52] U.S. Cl. ....................................................... 208/65
[58] Field of Search .......................................... 208/65

[56] References Cited

U.S. PATENT DOCUMENTS 4,464,249  8/1984  Mooi et al. .............................. 208/65

Primary Examiner—Curtis R. Davis
Attorney, Agent, or Firm—S. R. La Paglia; T. G. De Jonghe

[57] ABSTRACT

A multi-stage catalytic reforming process using a catalyst having a high rhenium to platinum ratio in the first stage or stages and a catalyst having a still higher rhenium to platinum ratio for the last stage. The process comprises:

(a) contacting a naphtha feed with a first stage catalyst comprising rhenium and platinum, and having a rhenium to platinum weight ratio of at least 1.7, under catalytic reforming conditions in one or more first reforming stages of a reforming unit to obtain intermediate reformate; and (b) contacting the intermediate reformate, under catalytic reforming conditions in a last stage of the reforming unit, with a last stage catalyst comprising rhenium and 0.2 to 2.0 weight percent platinum, and having sufficient rhenium so that the last stage catalyst has at least 0.5 weight percent rhenium beyond that necessary to attain a 1.7 rhenium to platinum weight ratio.

8 Claims, 2 Drawing Sheets

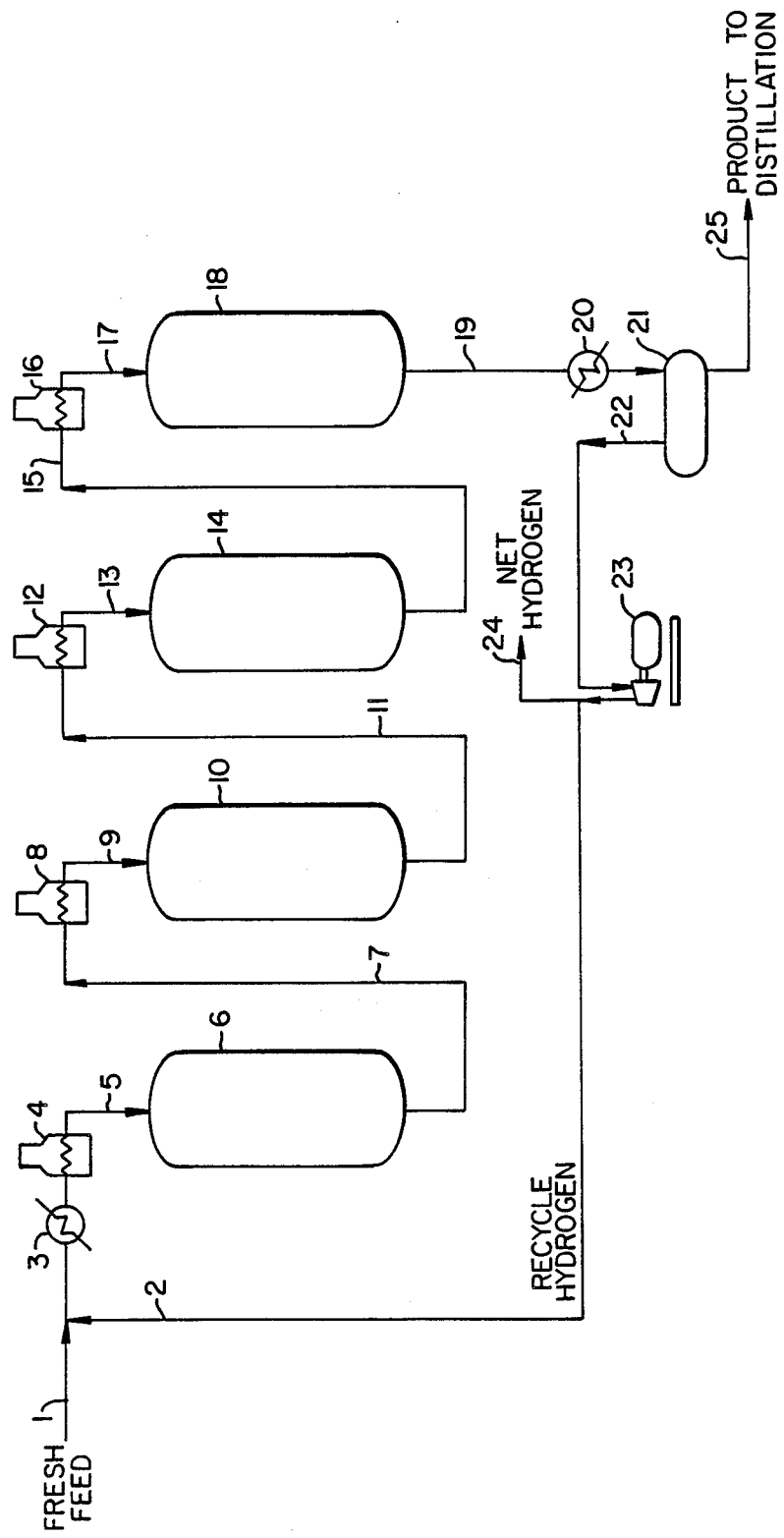
FIG._1.

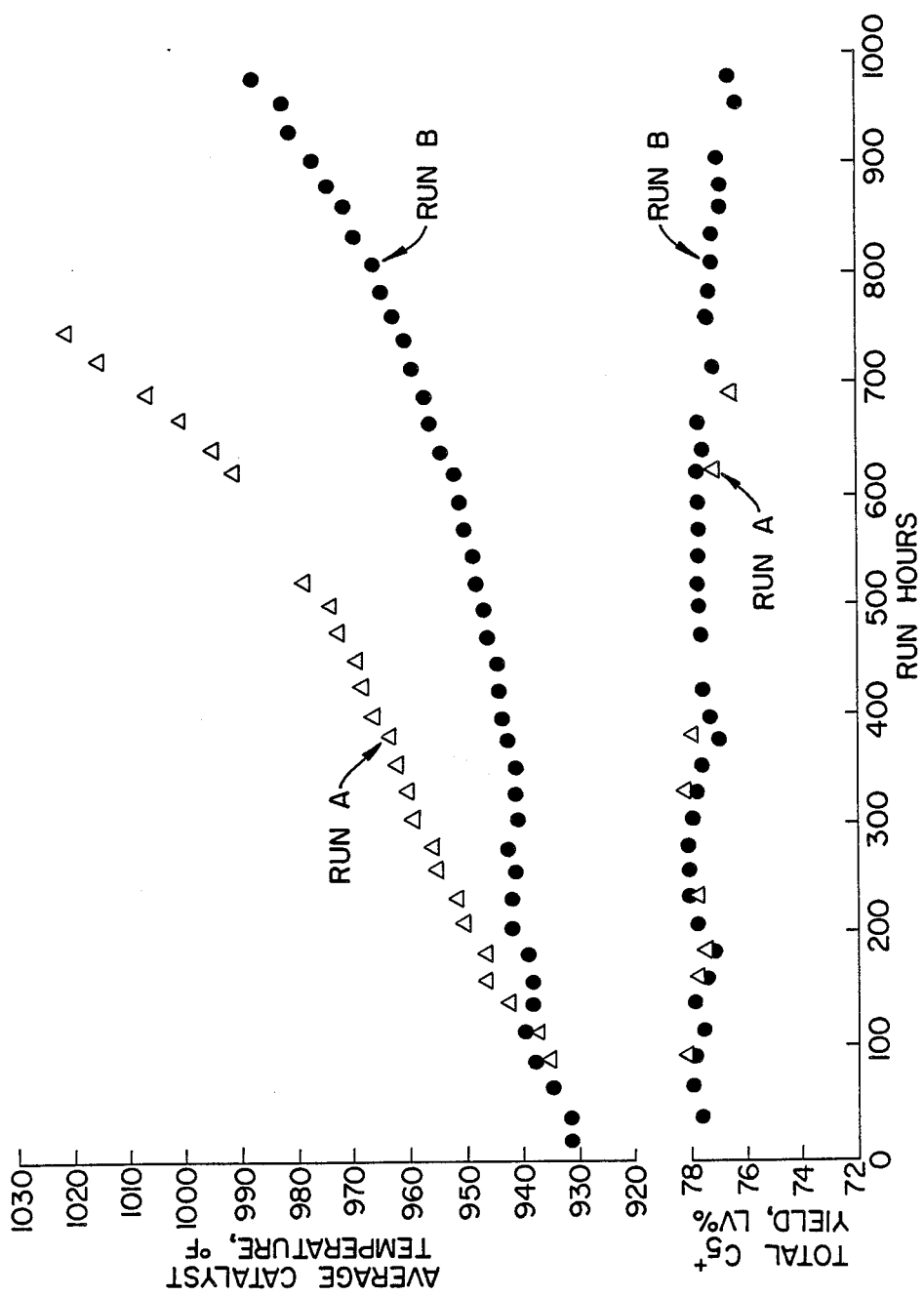
FIG._2.

MULTI-STAGE CATALYTIC REFORMING WITH HIGH RHENIUM CONTENT CATALYST

BACKGROUND OF THE INVENTION

The present invention relates to catalytic reforming using platinum-rhenium catalysts with relatively high rhenium content.

Catalytic reforming to upgrade naphtha or low-boiling range hydrocarbons to higher octane gasoline has been practiced for many years using catalysts comprising platinum on a refractory support, such as alumina. In the 1960's a major advance was made in this area when it was discovered that, in reforming a low-sulfur content hydrocarbon feedstock, the use of a catalyst comprising platinum and rhenium on alumina provided greatly improved yield stability and a much lower fouling rate. See U.S. Pat. No. 3,415,737 to Kluksdahl.

Since that time, a number of other patents have issued in the area of catalytic reforming using platinum rhenium catalysts. Some of these patents have been particularly focused on use of relatively high rhenium to platinum ratio catalysts, including the following: U.S. Pat. No. 4,356,081 to Gallagher, which discloses the use of catalysts having rhenium to platinum ratios of from about 1.08 up to as high as 17, rhenium contents from 0.362 to 0.875 weight percent and platinum contents from 0.05 to 0.344 weight percent; U.S. Pat. No. 4,425,222 to Swan, which discloses multi-stage reforming using forward reactors having a catalyst with rhenium to platinum ratio less than 1.2, a rearward reactor having a catalyst with a rhenium to platinum ratio greater than 1.5, and a swing reactor having some catalyst of each ratio; U.S. Pat. No. 4,427,533 to Swan, which discloses forward reactors having a rhenium to platinum ratio of less than 0.5, intermediate reactors having a rhenium to platinum ratio of less than 1.2 and a rearward reactor having a rhenium to platinum ratio greater than 1.5; U.S. Pat. No. 4,436,612 to Oyekan et al, which discloses the use of catalyst in forward reactors having a rhenium to platinum ratio of less than 1.0 and rearward reactors containing catalyst with rhenium to platinum ratio greater than 1.5; U.S. Pat. No. 4,440,626 to Winter et al, which discloses forward reactors having a rhenium to platinum ratio of less than 1.2 and rearward reactors (which contain 40 to 90% of the catalyst) having rhenium to platinum ratio greater than 1.5; U.S. Pat. No. 4,440,627 to Markley, which discloses catalytic reforming with forward reactors having a catalyst with rhenium to platinum ratio less than 1.2 and rearward reactors having a catalyst with rhenium to platinum ratio greater than 1.5 and with the start of run temperature being between 875° and 930° F.; U.S. Pat. No. 4,440,628 to Winter et al, which discloses reforming with the catalyst in the rearward reactor having a rhenium to platinum ratio greater than 1.5 and with certain process limitations; U.S. Pat. No. 4,464,249 to Mooi, which discloses reforming using a catalyst with rhenium to platinum ratios from 0.5 to 3.4 and with the platinum content of the catalyst in the first reforming stage being from 1.5 to 10.0 times the amount of platinum in the last stage; U.S. Pat. No. 4,613,423 to Swan which discloses staged reforming using a catalyst containing platinum-rhenium-iridium; and U.S. Pat. No. 4,613,424 to Schorfheide which discloses addition of sulfur to a rearward reactor in a multi-stage reforming process which uses platinum-rhenium or platinum-rhenium-iridium catalyst.

The references referred to above are not directed to the use of catalytic reforming catalysts containing rhenium in excess of a base ratio of rhenium to platinum. Also, the references do not direct toward the use of high rhenium to platinum ratio catalyst in the first stage (although the language may admit of such use in some instances) and instead, the references tend to direct away from the use of high rhenium to platinum ratio catalyst in the first stages. See, for example, the Mooi reference which states at Column 2, line 38, "It has been found that the presence of rhenium tends to inhibit and have a deleterious affect upon the activity of the platinum group metal catalyst to catalyze a naphthene dehydrogenation reaction."

Naphthene dehydrogenation is one of the main reactions taking place in the first stage of a multi-stage catalytic reforming unit. Also, it may be noted that typically in the above references, the ratios of rhenium to platinum preferred for the first stage catalysts are 1.2, 1.0, or lower ratios.

SUMMARY OF THE INVENTION

According to the present invention, a process is provided for catalytic reforming. The process comprises (a) contacting a naphtha feed with a first catalyst comprising rhenium and platinum, and having a rhenium to platinum weight ratio of at least 1.7, under catalytic reforming conditions in one or more forward reforming stages of a reforming unit to obtain intermediate reformate; and (b) contacting the intermediate reformate, under catalytic reforming conditions in a last stage of the reforming unit, with a last stage catalyst comprising rhenium and 0.2 to 2.0 weight percent platinum, and having sufficient rhenium so that the last stage catalyst has at least 0.5 weight percent rhenium beyond that necessary to attain a 1.7 rhenium to platinum weight ratio.

Preferably the ratio of rhenium to platinum is at least 1.8 for the first stage catalyst, and the last stage catalyst contains sufficient rhenium so that it has at least 0.5 weight percent rhenium beyond that necessary to attain a 1.8 ratio.

Particularly preferred catalysts for use in the process of the present invention are those wherein the ratio of rhenium to platinum for the first stage catalyst is at least 2.0, and wherein the last stage catalyst contains sufficient rhenium so that it has at least 0.5 weight percent rhenium beyond that necessary to attain a ratio of 2.0 rhenium to platinum.

According to a preferred embodiment, the ratio of rhenium to platinum in the first stage catalyst is from 1.7 to 5.0, the rhenium is from 0.35 to 3.0 weight percent of the catalyst and the platinum is from 0.2 to 1.7, and wherein the ratio of rhenium to platinum in the last stage catalyst is from 3.0 to 10.0, the rhenium is from 0.7 to 6.0 weight percent of the catalyst and the platinum is from 0.2 to 2.0.

According to a more preferred embodiment, the ratio of rhenium to platinum in the first stage catalyst is from 1.7 to 3.0, the rhenium is from 0.35 to 3.0 weight percent of the catalyst and the platinum is from 0.2 to 1.7 weight percent, and wherein the ratio of rhenium to platinum in the last stage catalyst is from 3.0 to 7.0, the rhenium is from 0.9 to 6.0 weight percent of the catalyst and the platinum is from 0.2 to 2.0 weight percent of the catalyst.

For the various embodiments of the invention described herein, preferably the amount of rhenium in the last stage catalyst is at least 0.5 weight percent greater than necessary to achieve the rhenium to platinum ratio of the first stage catalyst.

Among other factors, the present invention is based on our finding that advantageous results in terms of run length and maintenance of product yield are achieved in a multi-stage reforming process by using catalysts wherein the ratio of rhenium to platinum for the catalysts is relatively high in all stages, and further, in the last stage, the catalyst has an excess of rhenium over that necessary to attain the rhenium to platinum ratio of the first stage catalyst.

Thus, in the present invention, we believe there are desirable catalytic sites associated with rhenium in excess of that necessary to achieve the platinum-rhenium sites characteristic of a specified, or base, atomic ratio. This, however, is simply a theory of operation and we do not limit the present invention to any particular theory of operation. In any event, it is important in the present invention to have catalysts with a substantial excess of rhenium by weight over the platinum by weight in all the stages, and, in the last stage, we particularly prefer to have a catalyst with a very large weight percent excess of the rhenium. Thus, the last stage preferably has a 3.0 or higher ratio of rhenium to platinum by weight for the catalyst. More preferably, the ratio of rhenium to platinum for the last stage is 4.0 or higher and still more preferably, 5.0 or higher. As the gram-atomic weights of rhenium and platinum are close to one another (186.2 for Re and 195.1 for Pt), the gram-atom ratios of rhenium to platinum are approximately the same as the weight ratios. Ratios given herein are always weight ratios unless otherwise stated.

Also, contrary to the general direction of the prior art, the present process requires the ratio of rhenium to platinum be considerably greater than 1 or 1.2 in the catalysts of the forward stages. In the first stage or forward stages of the process of the present invention, the ratio of rhenium to platinum for the catalyst is at least 1.7, preferably at least 1.8 and most preferably about 2.0 or higher. Particularly preferred ratios for rhenium to platinum for the catalyst in the first stage or forward stages are within the range of about 1.7:1 to 3.0:1. We have found that the use of high rhenium content catalyst in all stages, and catalyst with "excess" rhenium in the last stage catalyst, results in lower fouling rates than when high rhenium (e.g., 2:1, rhenium to platinum) catalyst is used in all the stages.

More than one catalyst can be used in the forward stages (stages ahead of the last stage), but in the present invention these catalyts all must have relatively high rhenium to platinum ratios, preferably ratios of at least 1.7. For convenience, the catalyst in the first stage, (or the forward stages, if all contain the same catalyst) is herein referred to simply as "first catalyst".

DRAWING

FIG. 1 is a schematic illustration of a multistage catalytic reforming process.

FIG. 2 illustrates the results of two reforming runs, one in accordance with the present invention and one not.

DETAILED DESCRIPTION

Referring now in more detail to FIG. 1, fresh feed is introduced to the catalytic reforming unit or process via line 1. Fresh feed to the reforming process is a light hydrocarbon feed, for example, a naphtha fraction. Generally, the naphtha will boil in a range falling within the limits of from about 150° to 450° F. and preferably from about 190° to 400° F. The hydrocarbon feedstock can be, for example, either a straight run naphtha or a thermally cracked or catalytically cracked naphtha or blends thereof.

For purposes of the present invention, it is preferred that the feed to the reformer be substantially sulfur free; that is, the feed preferably contains less than about 5 ppm sulfur, and more preferably less than 1 ppm, and still more preferably, less than 0.3 ppm. In the case of a feedstock which is not already low in sulfur, acceptable levels can be reached by hydrotreating the feedstock in a pretreatment zone where the naphtha is contacted with a hydrogenation catalyst which is resistant to sulfur poisoning. A suitable catalyst for this hydrode-sulfurization process is, for example, an alumina-containing support upon which is dispersed a minor proportions of molybdenum and cobalt. Hydrodesulfurization is ordinarily conducted at a temperature from 550° F. to 800° F., a pressure from 200 to 2000 psig, and a liquid hourly space velocity from 1 to 5. The sulfur contained in the naphtha is generally converted to hydrogen sulfide which can be removed as a gas prior to the reforming reactors using suitable conventional means.

Recycle hydrogen is combined with the light hydrocarbon feed via line 2, heated in exchanger 3 and in furnace 4, and then the combined hydrogen and naphtha feed are introduced to the first stage catalytic reforming reactor 6. In reactor 6, the feed is contacted with a first catalyst comprising platinum and rhenium on an inorganic refractory support, such as an alumina support. In accordance with the present invention, the first catalyst has a high rhenium to platinum ratio, preferably at least 1.7, more preferably at least 1.8, most preferably at least 2.0. The primary reaction in the first stage is generally dehydrogenation. However, other reactions occur and the first stage reactor is part of an integrated series of reactors for achieving the overall catalytic reforming to upgrade the hydrocarbon feed to high octane product.

The platinum rhenium catalyst used in the first stage reactor 6, as stated above, is supported on a refractory oxide, such as alumina. Also, it is preferred to include a halide in the catalyst, especially chloride. Preferred amounts of the halide, such as chloride, are from 0.5 to 1.5 weight percent of the catalyst. The catalysts which are used in the present invention are described in more detail hereinbelow.

The effluent from the first stage reforming reactor is withdrawn via line 7, heated in furnace 8 and introduced via line 9 to the second stage reforming reactor, reactor 10.

Similarly, in the preferred scheme illustrated in the drawing, the effluent of reactor 10 is withdrawn via line 11, heated in furnace 12 and then fed via line 13 to reactor 14. Additional dehydrogenation occurs in the second and third stage reactors, and also dehydroisomerization, and dehydrocyclization. According to preferred embodiments of the present invention, the catalysts used in these intermediate stages also have high rhenium to platinum ratios, as is the case with the catalyst used in the first stage. Although different catalysts can be used in each of the forward stages, that is, reactor 6 as stage 1, reactor 10 as stage 2 and reactor 14 as stage 3, according to one preferred embodiment, the same high rhenium catalyst is used in all of these forward stages. Preferably, the rhenium to platinum ratio is at least 1.7 for the catalyst used in all of these forward stages.

The amount of catalyst used in the forward stages may be from 10 to 70 volume percent of the total catalyst used in the reforming unit, preferably from 30 to 50 volume percent. Preferably the stage containing the largest single amount of catalyst is the last stage, which is reactor 18 in FIG. 1. The number of stages prior to the last stage can be more or less than the three reactor stages shown in the schematic drawing. A minimum of one stage is used prior to the last stage and at least two different catalysts are used in the process.

The effluent from reactor 14 is passed via line 15 to furnace 16 and then introduced via line 17 to the last stage of reactor 18. The effluent from reactor 18 is withdrawn via line 19, cooled in heat exchanger 20 and then hydrogen-rich recycle gas is separated as schematically indicated in separator 21. The hydrogen-rich gas is compressed via compressor 23 and recycled via line 2. Excess net hydrogen is withdrawn via line 24.

Product reformate is withdrawn from separator 21 via line 25. This product material is passed to a distillation section to remove light ends, etc., and obtain product $C_5+$ reformate.

The catalyst used in the last stage, according to the present invention, has rhenium in excess of that needed to achieve a 1.7 ratio of rhenium to platinum. The excess rhenium is at least 0.5 weight percent based on the weight of the catalyst, more preferably 0.5 to 1.5 weight percent, in excess of the rhenium required to attain a 1.7 ratio of rhenium to platinum. Although there may be more than two catalysts used in the reforming unit, for convenience, the present description is simplified to a first catalyst used in one or more of the reaction zones ahead of the last reaction zone, and a last stage catalyst which is used in the last reaction zone or last reactor of the reforming unit. The last stage catalyst is preferably 30 to 90 volume percent of the total catalyst in the reforming unit, more preferably, 50 to 70% of the total catalyst volume in the reforming unit. One of the primary reactions in the last stage is dehydrocyclization. The catalyst used in the last stage for dehydrocyclization and other reforming reactions is supported on a refractory inorganic oxide support, preferably alumina, and also preferably contains a halide, as is the case with the catalysts used in the forward stages of the reforming unit.

The amount of catalyst used in the various stages is preferably sufficient so that the overall liquid hourly space velocity (LHSV) is from 0.5 to 4.0, more preferably from 0.8 to 2.5. Preferably the hydrogen recycle gas rate in terms of recycle moles of hydrogen per mole of hydrocarbon fresh feed, is from 2.0 to 15, more preferably from 3.0 to 10.0. Preferred total pressures are from 100 to 350 psig in the various stages of the reforming unit. Preferred catalyst average temperatures are from 800° to 1000° F. The temperature varies from inlet to outlet of the reactors as most of the reforming reactions are endothermic. Inlet temperatures may be from 850° to 1000° F. and outlet temperatures may be from 750° to 1000° F. Also, the temperature varies during the course of the run, with average start-of-run temperatures for typical semi-regenerative operation being at the lower end of the 800° to 1000° F. range and end-of-run temperatures being at the upper end.

The present invention is preferably applied to semi-regenerative reforming operations, with onstream run lengths of 500 to 8000 hours, preferably 1000 to 5000 hours.

CATALYSTS

The catalysts which find use in the reforming process of the present invention comprise a halided, porous inorganic oxide carrier or support containing from 0.2 to 2 weight percent platinum promoted with 0.35 to 6.0 weight percent rhenium. By "porous" inorganic oxide support is meant an inorganic oxide having a surface area preferably from 50 to 700 $m^2/gm$ and more preferably from 150 to 400 $m^2/gm$. The support can be a naturally occurring or synthetically produced inorganic oxide or combinations of inorganic oxides. Acidic inorganic oxide supports can be used, such as the naturally occurring aluminosilicates, particularly when acid treated to increase the activity, or synthetically produced cracking supports, such as silica-alumina, silica-zirconia, silica-alumina-zirconia, silica-magnesia, silica-alumina-magnesia, and crystalline zeolitic aluminosilicates. Generally, however, reforming processes are preferably conducted in the presence of catalysts having a low cracking activity, i.e., catalysts of limited acidity. Hence, preferred catalyst supports are inorganic oxides such as magnesia and alumina.

The catalytic carrier or support which is particularly preferred for purposes of this invention is alumina. Any of the forms of alumina meeting the above-stated surface area specifications can be used, although gamma alumina is especially preferred. Furthermore, alumina can be prepared by a variety of methods satisfactory for purposes of this invention. The preparation of alumina for use in reforming catalysts is well known in the art.

The platinum and rhenium are disposed in intimate admixture with each other on the porous inorganic oxide catalyst support. The platinum and rhenium can be disposed by suitable techniques such as ion-exchange, coprecipitation, impregnation, etc. One of the metals can be associated with the carrier by one procedure, for example ion-exchange, and the other metal associated with the carrier by another procedure, e.g., impregnation. However, the metals are usually associated with the porous inorganic oxide support by impregnation. The catalyst can be prepared either by coimpregnation of the metals onto the porous inorganic oxide carrier or by sequential impregnation. In general, the carrier material is impregnated with an aqueous solution of a decomposable compound of the metal in sufficient concentration to provide the desired quantity of metal in the finished catalyst and the resulting mixture is then heated to remove volatiles. Chloroplatinic acid is an example of an acceptable source of platinum. Other feasible platinum-containing compounds, e.g., ammonium chloroplatinates and polyammineplatinum salts, can also be used. Rhenium compounds suitable for incorporation onto the carrier include, among others perrhenic acid and ammonium perrhenates.

Incorporation of the metals with the carrier can be accomplished at various stages of the catalyst preparation. For example, if the metals are to be incorporated in intimate admixture with the alumina support, the incorporation may take place while the alumina is in the sol or gel form followed by precipitation of the alumina.

Alternatively, a previously prepared alumina carrier can be impregnated with a water solution of the metal compounds. Regardless of the method of preparation of the supported platinum-rhenium catalyst it is desired that the platinum and rhenium be in intimate admixture with each other on the support and furthermore that the platinum and rhenium be uniformly dispersed throughout the porous inorganic oxide catalyst support.

The reforming activity of the catalyst is promoted by the addition of halides, particularly fluoride or chloride. The halides provide a limited amount of acidity to the catalyst which is beneficial to most reforming operations. The catalyst promoted with halide preferably contains from 0.1 to 3 weight percent total halide content and more preferably from 0.1 to 2 weight percent and still more preferably from 0.5 to 1.5 weight percent. The halides can be incorporated onto the catalyst carrier at any suitable stage of catalyst manufacture, e.g., prior to or following incorporation of the platinum and rhenium. Some halide is often incorporated onto the carrier when impregnating with the metals; e.g., impregnation with chloroplatinic acid results in chloride addition to the carrier. Additional halide can be incorporated onto the support simultaneously with incorporation of the metal(s) if so desired. In general, halides are combined with the catalyst carrier by contacting suitable compounds such as hydrogen fluoride, ammonium fluoride, hydrogen chloride, or ammonium chloride, either in the gaseous form or in a water soluble form with the carrier. Preferably, the fluoride or chloride is incorporated onto the carrier from an aqueous solution containing the halide.

Following incorporation of platinum and rhenium with the porous inorganic oxide, the resulting composite is usually dried by heating at an elevated temperature usually no greater than about 500° F. and preferably at about 200° F. to 400° F. Thereafter the composite is usually calcined at an even higher temperature, e.g., from 900° F. up to about 1050° F.

Subsequently, the carrier containing platinum and rhenium is heated at an elevated temperature in a reducing atmosphere to convert the platinum to the metallic state and reduce the valence state of the rhenium. Preferably the heating is performed in the presence of hydrogen, and more preferably in the presence of dry hydrogen. In particular, it is preferred that this reduction be accomplished at a temperature in the range of 500° F. to 1000° F., and preferably 500° F. to 800° F.

The catalyst composite used in the present invention, i.e., platinum and rhenium supported on a porous inorganic oxide carrier, should be sulfided for use in the naphtha reforming process. Presulfiding can be done in situ or ex situ by passing a sulfur-containing gas, e.g., $H_2S$, through the catalyst bed. Other presulfiding techniques are known in the prior art. Alternatively, the catalyst can be sulfided on startup by adding a sulfur-containing compound, e.g., $H_2S$ or dimethyldisulfide, to the reforming zone in the presence of the naphtha. The exact form of the sulfur used in the sulfiding process is not critical. The sulfur can be introduced to the reaction zone in any convenient manner. It can be contained in the liquid hydrocarbon feed, the hydrogen rich gas, a recycle liquid stream or a recycle gas stream or any combination thereof. After operating the reforming process in the presence of sulfur for a period of time short in comparison to the over-all run length which can be obtained with the catalyst, the addition of sulfur is preferably discontinued. The purpose for presulfiding the catalyst prior to contact with the naphtha or sulfiding the catalyst during the initial contact with naphtha is to reduce excessive hydrocracking activity of the catalyst which results in the production of high yields of light hydrocarbon gases, for example, methane.

EXAMPLES

Tests were made in laboratory reforming units having two reactors in series to compare a single high rhenium catalyst system (Run A) with a catalyst system having high rhenium catalyst in the first stage and very high rhenium catalyst in the last stage (Run B). In the first reactor for each test run, a 2:1 rhenium to platinum catalyst (comprising 50% of the total catalyst volume) was loaded in three layers separated by alundum interlayers to simulate the temperature profiles in the first three reactors of a four reactor reformer. The second reactor contained a single catalyst layer and represented a final reforming stage containing 50% of the total catalyst volume for the reforming unit. For Run A the second reactor vessel contained the same 2:1 rhenium to platinum catalyst as in the first reactor. For Run B the catalyst in the second reactor contained 0.9 weight percent rhenium in excess of the amount needed to attain the 2:1 rhenium to platinum ratio of the first stage catalyst. Besides the platinum and rhenium, both catalysts contained chloride in the range of 0.6 to 1.0 weight percent and the support was alumina. In both runs the average temperature of the second reactor was maintained 30° F. higher than that of the first reactor to simulate the temperature profile typical in a commercial reforming unit run with equal inlet temperatures.

The feed for both Run A and Run B was a Heavy Arabian Naphtha having an API gravity of 57.2; mass spec analysis of 65.6% paraffins, 21.1% naphthenes; and 13.1% aromatics; and D-86 distillation of start to 5 LV %, 218°/236° F.; 10 to 20 LV %, 243°/250° F.; 30 to 40 LV %, 259°/268° F.; 50 LV %, 277° F.; 60/70 LV %, 288°/300° F.; 80/90 LV %, 314°/330° F.; 95 LV %/EP, 344°/387° F. Reaction conditions were 200 psig, 2.8 liquid hourly space velocity (LHSV), 3.5 hydrogen to fresh feed hydrocarbon mol ratio, and constant product octane of 98.5 RON.

FIG. 2 compares the run plots of the single catalyst system (Run A) and the dual catalyst system (Run B). The dual catalyst system had a cycle length 40% longer than, and the same $C_5+$ liquid yield as, the single catalyst system. In each case, end of run was taken as the point at which $C_5+$ liquid yield had dropped by 1 LV % from its maximum value. The time-temperature curves in FIG. 2 represent the weighted average temperature of two reactors in each run normalized to the target octane.

What is claimed is:

1. A catalytic reforming process comprising:
   (a) contacting a naphtha feed with a first catalyst comprising rhenium and platinum, and having a rhenium to platinum weight ratio of at least 1.7, under catalytic reforming conditions in one or more forward reforming stages of a reforming unit to obtain an intermediate reformate; and
   (b) contacting the intermediate reformate, under catalytic reforming conditions in a last stage of the reforming unit, with a last stage catalyst comprising 0.2 to 2.0 weight percent platinum, and sufficient rhenium so that the last stage catalyst has at least 0.5 weight percent rhenium beyond that necessary to attain a 1.7 weight ratio of rhenium to platinum.

2. A process in accordance with claim 1 wherein the ratio of rhenium to platinum is at least 1.8 for both the first catalyst and the last stage catalyst, and the last stage catalyst contains sufficient rhenium so that it has at least 0.5 weight percent rhenium beyond that necessary to attain a 1.8 ratio.

3. A process in accordance with claim 1 wherein the ratio of rhenium to platinum for the last stage catalyst is at least 2.0, and the last stage catalyst contains sufficient rhenium so that it has at least 0.5 weight percent rhenium beyond that necessary to attain a 2.0 ratio.

4. A process in accordance with claim 1 wherein the ratio of rhenium to platinum in the first catalyst is from 1.7 to 5.0, the rhenium is from 0.35 to 3.0 weight percent of the first catalyst and the platinum is from 0.2 to 1.7 weight percent; and wherein the ratio of rhenium to platinum in the last stage catalyst is from 3.0 to 10.0, the rhenium is from 0.7 to 6.0 weight percent of the last stage catalyst and the platinum is from 0.2 to 2.0 weight percent.

5. A process in accordance with claim 1 wherein both catalysts comprise 0.5 to 1.5 weight percent halide and an alumina support.

6. A process in accordance with claim 3 wherein both catalysts comprise 0.5 to 1.5 weight percent chloride and an alumina support.

7. A process in accordance with claim 1 wherein the amount of rhenium in the last stage catalyst is at least 0.5 weight percent beyond that necessary to achieve the rhenium to platinum ratio of the first catalyst.

8. A process in accordnace with claim 3 wherein the amount of rhenium in the last stage catalyst is at least 0.5 weight percent beyond that necessary to achieve the rhenium to platinum ratio of the first catalyst.

* * * * *

UNITED STATES PATENT AND TRADEMARK OFFICE
Certificate

Patent No. 4,764,267                                              Patented August 16, 1988

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is Hong C. Chen, Cliff M. Detz, Larry W. Jossens, Harris E. Kluksdahl and Paul W. Tamm.

Signed and Sealed this 14th Day of March 1989.

Jeffrey V. Nase,
*Supervisory Petitions Examiner,*
*Office of the Deputy Assistant*
*Commissioner for Patents.*